United States Patent [19]

Zimpel et al.

[11] Patent Number: 5,283,934
[45] Date of Patent: Feb. 8, 1994

[54] AUTOMATED PART STORAGE AND MACHINING SYSTEM

[75] Inventors: John J. Zimpel, West Allis; David R. Koplin, Waukesha, both of Wis.

[73] Assignee: Kearney & Trecker Corporation, Fond du Lac, Wis.

[21] Appl. No.: 938,477

[22] Filed: Dec. 5, 1986

Related U.S. Application Data

[63] Continuation of Ser. No. 323,465, Nov. 20, 1981, abandoned.

[51] Int. Cl.$^5$ .............................................. B23Q 7/00
[52] U.S. Cl. ...................................... 29/33 P; 29/563; 483/15
[58] Field of Search ............... 29/33 P, 563, 568; 483/15

[56] References Cited
U.S. PATENT DOCUMENTS
4,237,598 12/1980 Williamson ........................... 29/568

Primary Examiner—Z. R. Bilinsky

[57] ABSTRACT

A machining system is provided which includes a selected number of machining centers for selectively cutting or machining metallic parts, the system further including a rack structure for providing inventory storage for parts which are to be machined by the centers. There is further provided a part transport device for moving a given one of the parts in a first part flow loop when the given part is in a condition which enables the part to be readily moved around a plant or other manufacturing establishment or to be shipped in commerce. The part transport device also moves the given part through a second part flow loop when the part is in a condition which enables the part to be machined by one of the machining centers. The first part flow loop comprises the movement of the given part from the inventory storage to a part preparation station and from the part preparation station to a finished part destination, the second part flow loop comprising movement of the part between the part preparation station and one of the machining centers. The system also includes a part monitoring system which keeps track of the location and machined status of every part contained in the machining system.

12 Claims, 5 Drawing Sheets

AUTOMATED PART STORAGE AND MACHINING SYSTEM

This is a continuation of U.S. application Ser. No. 06/323,465, filed Nov. 20, 1981 now abandoned.

BACKGROUND OF THE INVENTION

The invention disclosed and claimed herein pertains generally to machining systems which employ a single transport device to automatically move unmachined parts or workpieces from inventory storage to a machining center, and to move machined parts from a machining center to a specified final destination. More particularly, the invention pertains to systems of the above type wherein a single transport device is employed to move a part through both a first and a second part flow loop, the first loop comprising movement of the part between inventory storage and a machining preparation station and between the machining preparation station and a final destination, the second loop comprising movement of the part between the machining preparation station and one or more machining centers. Even more particularly, the invention pertains to systems of the above type wherein the transport device is employed to move parts through the first loop on standard storing and shipping pallets, and to move parts through the second loop on pallets which are also employed to selectively support the parts while they are being machined.

In certain types of manufacturing operations which involve the machining of metallic parts, overall operational efficiency is affected, to a very great extent, by the efficiency with which parts are handled and carried as they are moved through a part flow route. The flow route of a particular part starts at the initial location of the part in inventory storage, proceeds to a machining center or the like, where the part is selectively machined, and ends at some final destination. The final destination of the machined part may comprise, for example, a part inspection station, a finished parts pick-up station, a truck loading dock, or a location in inventory which is the same as or different from the initial location of the part.

It will be readily apparent that the efficiency of part flow in a machining or metal cutting operation is closely related to the amounts of time that various devices, which are used to move parts through the part flow route, are idle. It may therefore be very important, especially in operations which produce a comparatively small number of parts in a period of time (low-volume and mid-volume production) to limit the number of separate devices which are employed to transport parts through the part flow route, and to maximize the capabilities of the devices which are employed therefor. In addition to reducing idling time of the part transporting equipment, such limitation may serve to reduce plant space requirements and also the level of maintenance which is required for part transport equipment.

In order to significantly improve part flow efficiency in a machining operation, the present invention provides a comprehensive machining system, or cell, wherein a single device is used to perform all or most of the handling and transporting tasks which are required to move parts through the part flow route of the system. It is anticipated that an embodiment of the invention could usefully be employed to machine parts in the low and mid-volume ranges of part production, although it is by no means intended to limit the invention to such application. It is further anticipated that the invention may provide a system which may be operated in a completely automatic mode to move parts from an inventory storage to a machining center, and to move machined parts either back to inventory or to a system part exit point.

SUMMARY OF THE INVENTION

In the present invention, a machining system is provided which includes a storage structure having a number of discrete part storage locations. The system further includes a number of work units which are located proximate to the storage structure, for selectively machining parts. A part preparation station is located proximate to the storage structure for enabling a system operator to prepare a part, received from one of the part storage locations, for processing or machining by one of the work units. The system employs a single transport device to sequentially move a given part from one of the storage locations to the part preparation station, from the part preparation station to one of the work units, and from one of the work units to a selected final destination which is proximate to the storage structure.

Preferably, the storage structure comprises a vertically oriented rack structure provided with a number of discrete addressable bins, each of the bins comprising one of the part storage locations. Preferably also, the part preparation station includes a part preparation shuttle for moving the given part between the part transport device and a selected location within the part preparation station, the part transport device comprising means for selectively engaging a storing and shipping pallet and a machine pallet. The part transport device moves the given part from one of the storage bins to the part preparation shuttle, and from the part preparation shuttle to the final destination, upon the storing and shipping pallet, and moves the given part between the part preparation shuttle and one of the machining centers upon the machine pallet. The part preparation station comprises a means for enabling a system operator to transfer the given part between the storing and shipping pallet and the machine pallet with comparatively little effort, and in a short period of time.

In a preferred embodiment of the invention, each of the work units comprises a machining center for performing specified metal cutting operations. The part transport device comprises a stacker crane which is constrained to move linearly along one side of the rack structure, the part preparation station being located on the other side of the rack structure. The part preparation shuttle includes a first shuttle device which traverses a gap in the rack structure to move a storing and shipping pallet, and a part carried thereupon, between the stacker crane and an operator position in the part preparation station. The part preparation station also includes a second shuttle device, which likewise traverses the rack structure to move a machine pallet and a part thereupon between the stacker crane and the operator position. First and second air stations, of different configurations, are respectively employed in the first and second shuttle device to enable both types of pallets, and parts thereupon, to be moved into and out of the part preparation station with a minimum amount of effort.

OBJECTS AND FEATURES OF THE INVENTION

An object of the invention is to optimize the efficiency with which parts are moved through a part processing system, wherein parts must be moved from inventory storage to a processing unit, such as a machine tool or machining center, and must thereafter be moved either back to inventory storage or to a point at which processed parts exit the system.

Another object is to minimize the equipment which is required to handle and move parts in a system of the above type, and also to minimize the idle time of such equipment.

Another object is to provide a system of the above type wherein a single device, such as a stacker crane, is employed to move parts between inventory storage and the processing units, and between the processing units and the part exit point.

Another object is to provide a comprehensive machining system or cell which includes a parts inventory storage, a number of machining centers, efficient means for moving parts between inventory storage and the machining centers, and means for maintaining close inventory control of all parts contained in the system as they are stored, moved and machined.

Another object is to provide a machining system of the above type wherein parts are moved on machine pallets, on which they are set up for machining, and on storing and shipping pallets of a type which are commonly used both to store metal parts in inventory and to ship them in commerce.

Another object is to provide a machining system of the above type which may be operated in a fully automatic mode, without the intervention of a human operator, to machine a number of parts in a prespecified manner.

These and other objects of the invention will become more readily apparent from the ensuing specification, when taken together with the drawings.

DETAILED DESCRIPTION OF THE PREFERRED EMBODIMENT

Figure 1:
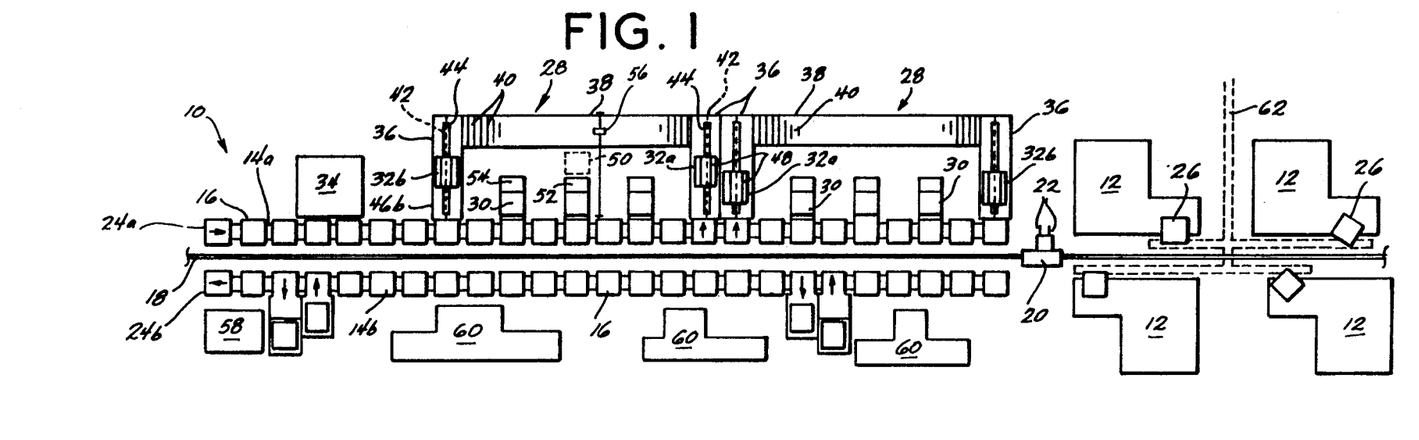
FIG. 1 is an overhead view showing the principal components of an embodiment of the invention and the relationships therebetween.

Referring to FIG. 1, there is shown a combined machining and inventory storage system 10, which is provided with a number of machining centers 12 and with storage rack structures 14a 14b. Each machining center 12 comprises a machine tool or machining center, such as the MILWAUKEE-MATIC 800 manufactured by the Kearney & Trecker Corporation, which may be directed by either an operator or a remotely located computer device to perform a succession of machining operations on a metallic part which has been presented to the center. It is to be noted that "MILWAUKEE-MATIC" is a registered trademark of the Kearney & Trecker Corporation.

Rack structure 14a and 14b each comprises a number of storage bin columns 16, which are linked together, in linear relationship, along a linear track 18. Each column 16 comprises a number of discrete, vertically stacked storage bins, each bin being identifiable by its vertical level and by its position along track 18. Each bin has an opening which faces track 18, and the bins are sized so that they may receive and store parts which are entered into system 10 for machining by machining centers 12. Some of the bins of the rack structures may also be employed to store fixtures which are used to set parts up for machining by the machining centers. All of the parts and fixtures in the storage bins are stored on wooden pallets, such pallets being of a type which is widely used to store metallic parts in inventory, to move parts around a plant or factory by means of a fork lift, or to ship of transport parts in commerce.

To insert parts into and draw parts out of the storage bins of rack structures 14a and 14b, and to move parts around system 10 in support of the machining operations thereof, system 10 is provided with a stacker crane 20. Stacker crane 20 comprises a type of device which is well-known in the storage and warehousing arts, and which is commonly used therein to move goods into and out of identifiable, vertically oriented storage bins. While specific details of the construction of stacker crane 20 may vary in accordance with specific applications, generally the stacker crane is provided with the capability of moving linearly, along the length of track 18, and of stopping at any point therealong. The stacker crane is further provided with a transverse member mounting a set of lifting forks 22, which may be controllably moved upwardly and downwardly, and which may be extended outwardly from, and be drawn inwardly toward the center line of track 18. Respective components of stacker crane 20 are sized or dimensioned so that the stacker crane can be directed to any of the storage bins of storage racks 14a and 14b, and can employ its lifting forks 22 to insert thereinto or to retrieve therefrom a wooden pallet which bears or carries a part, parts or fixtures.

Stacker crane 20 can also be directed to an end of track 18 at which a part loading station 24a and a part exit station 24b are located. Station 24a comprises a point at which unfinished parts are received into system 10, upon wooden pallets, and station 24b comprises a point at which parts leave the system after they have been completely machined. The lifting forks of stacker crane 20 may be employed to receive wooden pallets containing parts at the part loading station, and to deliver wooden pallets containing parts to the part exit station.

Referring further to FIG. 1, there are shown machining centers 12 located at the end of track 18 opposite from stations 24a and 24b, each machining center 12 being provided with a machine pallet 26.

As is well known in the art, a machine pallet is a sturdy, metallic base or platform, which is employed to support a part in rigid relationship with the spindle of a machining center as the spindle drives a tool to selectively cut or machine the part. Stacker crane 20, in addition to the above capabilities, is capable of moving along track 18 to a specified one of the machining centers 12, and of operating its lifting forks 22 to engage the machine pallet 26 of the specified center. The stacker crane is then moved back along track 18 to a part preparation station 28. An air pallet 30 of the part preparation station, described hereinafter in detail, is movable through a gap or opening provided in rack structure 14a to receive the machine pallet 26 from the lifting forks of the stacker crane. The machine pallet is then moved into the part preparation station upon the air pallet 30.

In a like manner, stacker crane 20 may be operated to receive a machine pallet 26 from an air pallet 30, and to return the machine pallet to its machining center. A machining center may employ a shuttle device of conventional design (not shown) to transfer its machine pallet between the lifting forks of the stacker crane and the working or operational position of the machine pallet on the machining center.

Referring yet again to FIG. 1, there are shown air pallets 32a and 32b at each preparation station 28 which, in like manner with air pallets 30, are accessible to stacker crane 20 through selectively positioned gaps in rack structure 14a. Air pallets 32a, described hereinafter in detail, are proved to receive wooden or storage pallets 70 which bear parts or fixtures from stacker crane 20, and air pallets 32b are provided convey or deliver such wooden pallets to stacker crane 20.

The movement and operation of stacker crane 20 may be selectively directed by a human operator, by a local computer carried aboard the stacker crane, or by a system computer 34, which is also capable of remotely operating each of the machining centers 12. In addition, system computer 34 keeps track of the location of every part contained in system 10, at all times, and maintains a record of the machining performed on each part. Computer 34 also uniquely identifies or addresses each of the bins or storage locations of storage racks 14a and 14b.

In order to perform a specified set of machining operations upon a part of a particular type, stacker crane 20 is directed, by one of the above means, to retrieve a part of the particular type from its storage bin, and to deliver such part, upon its wooden pallet, to the air pallet 70 32a of one of the part preparation stations 28. The part, wooden pallet, and air pallet 32a are then linearly translated over, or along, an air table 36. At the same time, stacker crane 20 is dispatched to retrieve a fixture from one of the storage bins which corresponds to parts of the particular type.

Each air table 36 comprises a smooth, rigidly supported horizontal surface, one end of which is accessible to stacker end of which abuts a linear conveyor 38, which is provided with powered rollers 40. Air pallet 32a is moved or translated over an air table 36 by means of a drive chain 42, which is connected to the air pallet 32a through a slot 44 provided in the air table. As pallet 32a is translated, an array of airbags on the underside thereof are maintained in an inflated condition to provide a cushion or film of air between the air pallet 32a and the table 36. Such air cushion is sufficiently strong to support the combined weight of an air pallet 32a and a part and a wooden pallet carried thereby, whereby friction between the air pallet 32a and the horizontal surface of the air table 36 is virtually eliminated. An air pallet 32a and table 36 together comprise a wood pallet air station 46a.

Each air pallet 32b of FIG. 1 is identical to an air pallet 32a, and is likewise supported upon and moved over an air table 36. An air pallet 32b and a table 36 together comprise an air station 46b.

When the air pallet 32a reaches the end of air table 36 which abuts conveyor 38, freely turning rollers 48, which are mounted upon the air pallet 32a to carry a part and its wooden pallet, are brought into aligned relationship with powered rollers 40. While in movement, an air cell brake 49 prevents the rollers from turning freely. A human operator may then, with little effort, slide the part and wooden pallet onto rollers 40 from the air pallet 32a, and activate conveyor 38 to move the part and wooden pallet to an operator position 50, within the part preparation station. At the same time, the pallet 32a is translated back toward rack structure 14a, to receive the aforementioned corresponding fixture from the stacker crane. Air station 46a and conveyor 38 are then operated, as aforedescribed, to move the fixture, upon its wooden pallet, to operator position 50.

After delivering the corresponding fixture to the air station 46a, stacker crane 20 is moved along track 18 to the machining center 12 which is to perform the aforementioned specified set of machining operations. The stacker crane engages the machine pallet 26 of such center, and delivers it to an air pallet 30 of the part preparation station 28 to which the aforedescribed part and fixture have been delivered. The operator then manually draws or pulls the air pallet 30 into the part preparation station, over or across an air table 52, to operator position 50. Air, table 52 comprises a smooth rigidly supported horizontal surface, one end of which is accessible to stacker crane 20 through a gap in rack structure 14a, and the other end of which is proximate to operator position 50. As with air pallets 32a and 32b, when air pallet 30 is translated over air table 52, an array of airbags on the underside of pallet 30 is inflated to maintain a cushion or film of air between the pallet 30 and the table 52. Such cushion is sufficiently strong to support the combined weight of the air pallet 30 and a machine pallet carried thereupon, whereby an operator, with comparatively little effort, may translate a pallet 30 backwardly and forwardly over an air table 52. An air pallet 30 and an air table 52 together comprise a machine pallet air station 54.

It is to be noted that an operator position 50 comprises any location within a part preparation station 28 to which a part, a fixture corresponding thereto, and a machine pallet can be brought into closely spaced relationship, by the coordinated operation of an air station 46a, an air station 54 and a conveyor 38. When all of such elements are together in an operator position, a human operator may, with minimum physical movement, take the fixture from its wooden pallet and secure it to the machine pallet. The operator may then employ the fixture to attach the part to the machine pallet so that the part is fixed in a position and orientation, relative to the machine pallet, which is required by the specifications of the machining operations which are to be performed.

If the part is comparatively heavy, the operator may employ an underhung bridge crane 56 to transfer the part from its wooden pallet to the machine pallet 26.

When a part has been joined to a machine pallet 26 as required for machining, the part is set up, and the machine pallet is said to be "loaded". The loaded machine pallet 26 is moved backwardly along air table 52, by manual translation of air pallet 30, and is engaged by lifting forks 22 of stacker crane 20. The stacker crane takes the loaded pallet 26 back to its machining center 12, whereupon the machining center, under the control of either a machine operator or system computer 34, performs the required set of machining operations.

After the part has been machined, the loaded machine pallet is returned to operator position 50 by the coordinated operation of stacker crane 20 and air station 54. The fixture and the newly machined part are replaced upon their respective wooden pallets, and air station 54, conveyor 38, air station 46b and stacker crane 20 are respectively employed to return the machine pallet 26 to its machining center, to return the fixture to a storage bin, and to move the machined part to a specified final destination. Such final destination may comprise one of the storage bins, a finished parts inspection station 58, part exit station 24b, or a manually operated milling or metal cutting machine 60. Air stations 46a and shortened air stations 46b, situated in gaps or openings in rack structure 14b, are provided for moving parts between stacker crane 20 and inspection station 58 and machines 60.

It will be seen from FIG. 1 that two part preparation stations 28 are situated in adjoining relationship with one another. A single operator is thereby enabled to move back and forth between the stations 28, with a minimum of wasted effort, to service both stations in setting up parts for machining. The number and location of part preparation stations 28 which is most efficient for a particular application, as well as the number of machine pallet air stations 54 provided in each part preparation station, will be related to the time required to machine parts and to move them around system 10 in the particular application.

Referring once more to FIG. 1, there is shown a coolant trough 62 placed beneath each machining center 12 so that metal chips and coolant, generated by metal cutting activity, are directed into trough 62 by means of gravitational force. The need for chip conveyors in system 10 is thereby eliminated.

Figure 2:
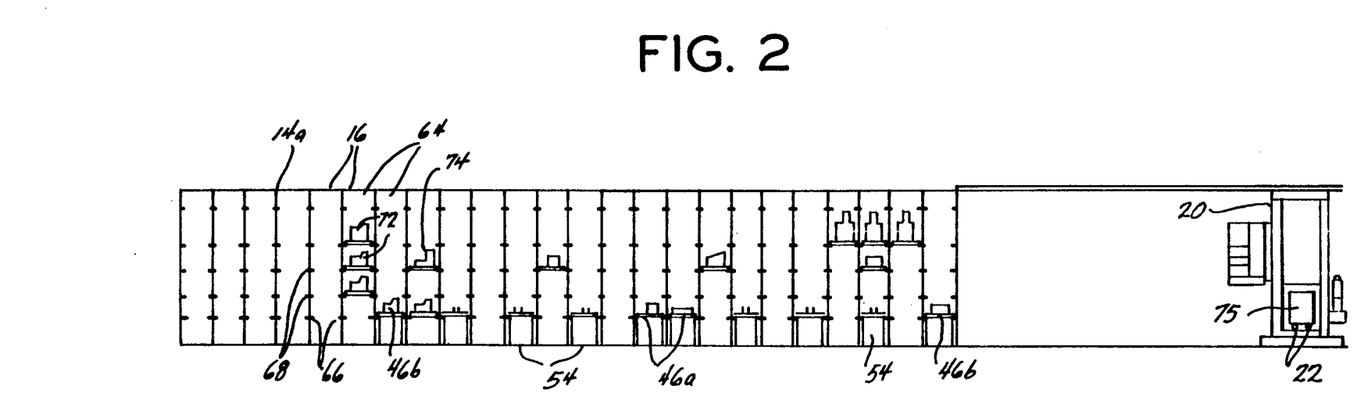
FIG. 2 is an elevational view showing a stacker crane and a storage rack structure for the embodiment of FIG. 1.

Referring to FIG. 2, there is shown rack structure 14a comprising a number of storage bin columns 16, wherein each column 16 comprises a number of vertically stacked storage locations, or bins 64. Each bin 64 is a part storage space which is bounded by the sides 66 of its column 16 and by wood pallet support brackets 68. The brackets 68 which are positioned at the bottom of each storage bin 64 are capable of supporting a wooden pallet 70 of the aforedescribed type, as well as a part 72 or a fixture 74 placed thereupon. The opposing bottom brackets 68 of a storage bin are spaced apart from one another so that by selective movement of stacker crane 20, and by selective manipulation of the transverse member 75 thereof, lifting forks 22 may be positioned between the opposing bottom brackets, either to place a wooden pallet 70 thereupon or to remove a wooden pallet 70 therefrom.

Referring further to FIG. 2, there are shown gaps or openings provided through some of the columns 16 of rack structure 14a to allow wooden pallets 70 carrying parts 72 and fixtures 74 to be exchanged between stacker crane 20 and air stations 46a and 46b, and to enable machine pallets 26, and parts set up thereupon, to be exchanged between stacker crane 20 and air stations 54.

Figures 3, 11:
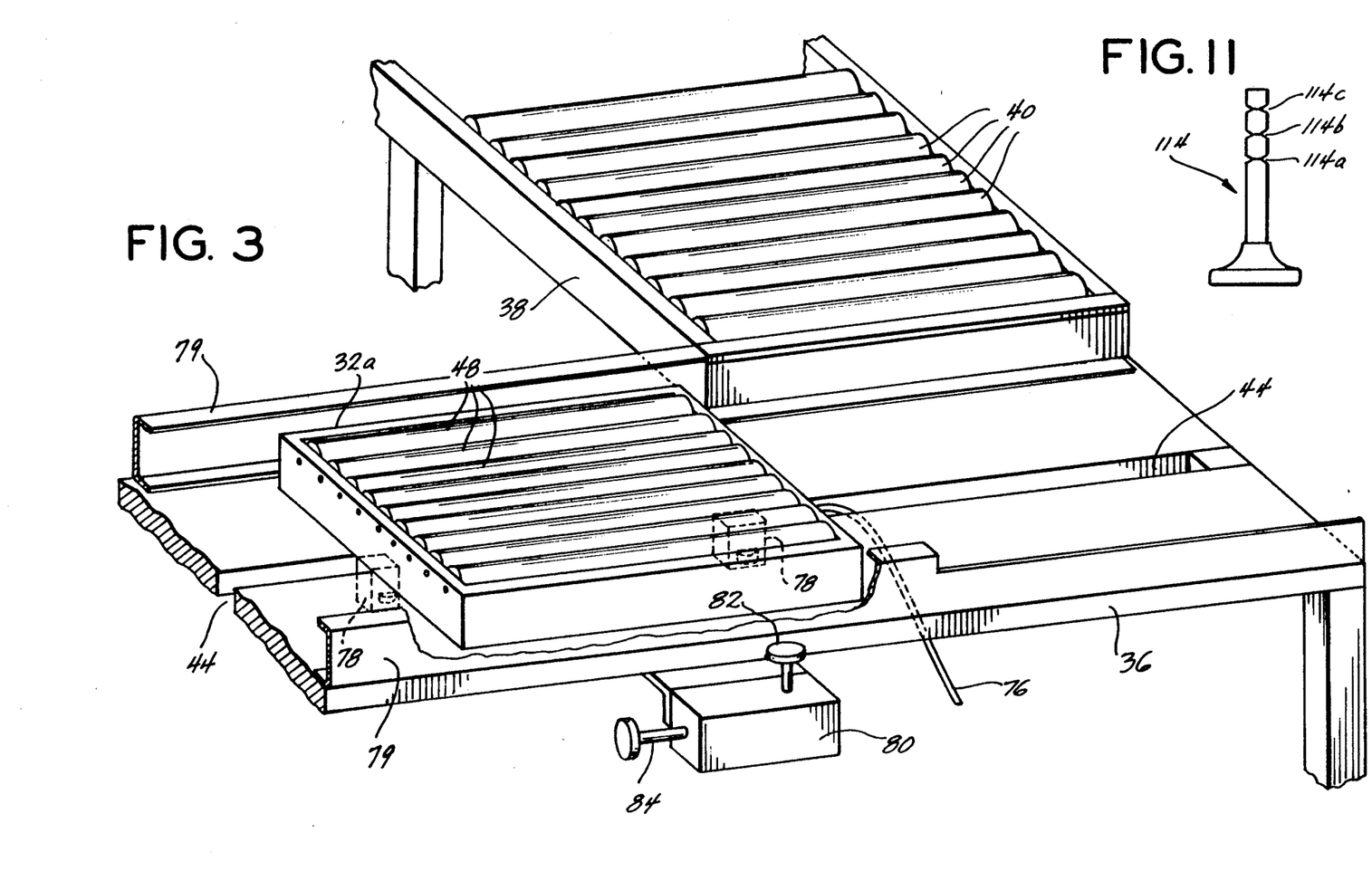
FIG. 3 is a perspective view showing the principal components of a wood pallet air station for the embodiment of FIG. 1.
FIG. 11 is a perspective view showing a switch for the machine air pallet of FIG. 10.

Referring to FIG. 3, there is shown an air pallet 32a (or 32b) supported upon air table 36 and translatable therealong, as aforementioned, upon a film or cushion of air. Slot 44, running nearly the length of air table 36, allows a pneumatic line 76 to remain coupled to air pallet 32a as air pallet 32a is translated over table 36. Air line 76 is employed to inflate each of a number of airbags attached to the underside of air pallet 32a, to generate and maintain the aforementioned cushion or film of air between the flat surface of table 36 and the underside of air platform 32a.

Referring further to FIG. 3, there are shown guide blocks 78 joined to the underside of air pallet 32a. Guide blocks 78 are sized or dimensioned to fit into slot 44, and are provided to prevent lateral or sideward movement of air platform 32a as air platform 32a is linearly translated over air table 36. C-channels 79 run along the sides of table 36 to support wooden pallets received from stacker crane 20.

To enable an operator to easily control the operation of an air station 46a (or 46b), a unitized control box 80 is provided therefore. A control switch 82 of box 80 enables the operator to selectively open and close air line 76, to respectively inflate or deflate the airbags attached to the underside of air pallet 32a. When the air bags are inflated, a control switch 84 is employed to selectively operate drive chain 42 to translate air pallet 32a forwardly or backwardly over air table 36. Control switch 84 can be operated whether switch 82 is engaged or not. Drive chain 42 is coupled to air pallet 32a through slot 44 as aforementioned, and is powered by a drive train located underneath table 36. The drive chain 42 and drive train may be of any suitable design occurring to those of skill in the art, and are not shown in FIG. 3.

Figure 4:
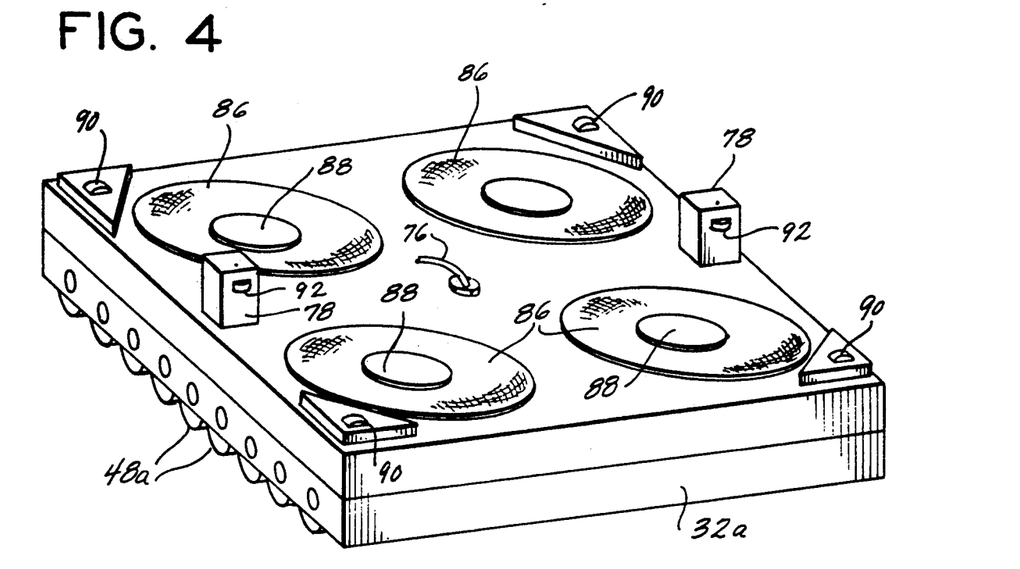
FIG. 4 is a perspective view showing the underside of an air pallet for the wood pallet air station of FIG. 3.

Referring to FIG. 4, there is shown airbags 86 positioned in a selected array on the underside of air pallet 32a, each airbag comprising an annular diaphragm which is formed of flexible rubber or like pliable material. Air line 76 is coupled to the interior of each airbag 86 so that the airbags are inflated or deflated when the line is respectively opened or closed. FIG. 4 also shows a center landing pad 88 positioned in the center of each airbag 86, and shows corner roller 90 positioned at each corner of the underside of air pallet 32a. Landing pads 88 and rollers 90 are provided to support air pallet 32a upon air table 36, in spaced apart relationship therefrom, when the airbags are in a deflated condition. Such spaced apart support protects deflated airbags 86 from metal chips or like debris which might be lying on air table 36.

Usefully, air bags 86 comprise a type of product such as that which is manufactured by Aero-Go Inc., and which is identified thereby as the "aero-Caster" load module on air bearing. It is to be noted that "Aero-Caster" is a registered trademark.

Referring further to FIG. 4, there is shown guide blocks 78 provided with rollers 92, which are formed of material such as hard rubber or the like. Rollers 92 abut the sides of slot 44 when guide blocks 78 are placed therein, and are provided to minimize friction between the guide blocks and the sides of slot 44 when air pallet 32a is translated over air table 36.

Figure 5:
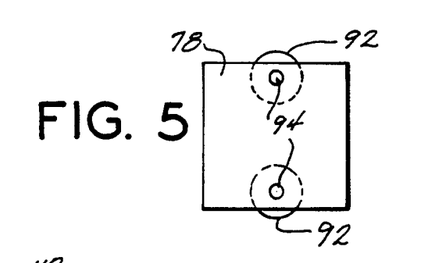
FIG. 5 is an overhead view of a cam roll of the air pallet of FIG. 4.

Referring to FIG. 5, there is shown rollers 92 rotatably mounted within recesses provided in guide blocks 78 by means of pins 94.

Figure 6:
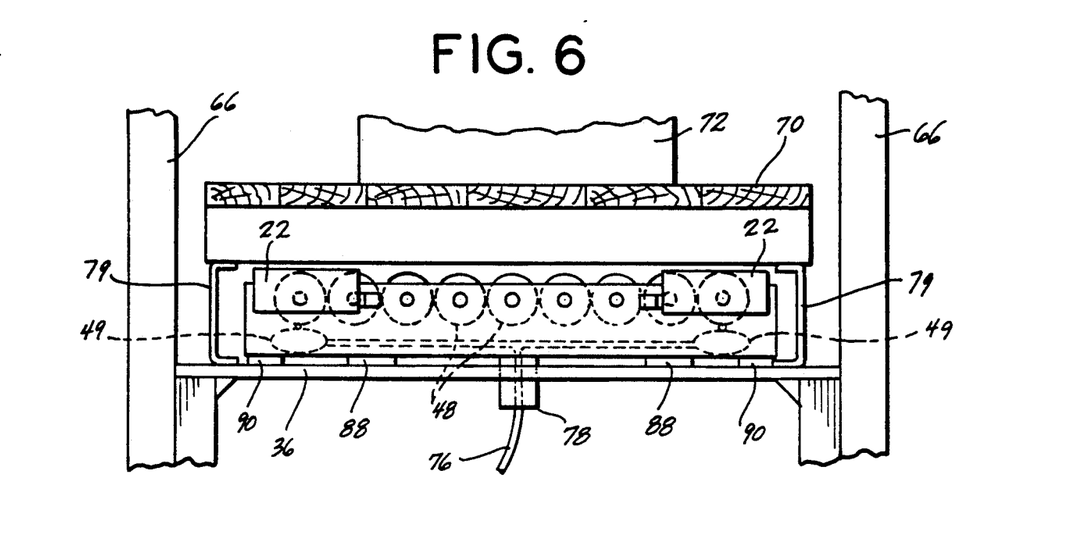
FIG. 6 is a sectional view showing the operational relationship between a stacker crane and the wood pallet air station of FIG. 3.

Referring to FIG. 6, there is shown lifting forks 22 of stacker crane 20 placing a wood pallet 70, together with a part 72 carried thereupon, upon C-channels 79 which pass into one of the aforementioned gaps in rack structure 14a. FIG. 6 further shows an air pallet 32a positioned directly beneath pallet 70, the air bags of the air pallet 32a being in a deflated condition. Air pallet 32a is thereby supported upon air table 36, at the extreme end thereof, upon center landing pads 88 and corner landing pads 90.

To load the wooden pallet 70 and part 72 upon the air pallet 32a, lifting forks 22 are withdrawn. Then, air line 76 is opened to inflate each of the air bags 86, whereby the airbags generate zones of compressed air. Such air zones, which together comprise the aforementioned cushion or film of air, raise air pallet 32a upwardly from air table 36, whereby air pallet 32a lifts the wooden pallet 70 and part 72 off of brackets 79. Air pallet 32a, pallet 70 and part 72 may then be translated along air table 36.

Figure 7:
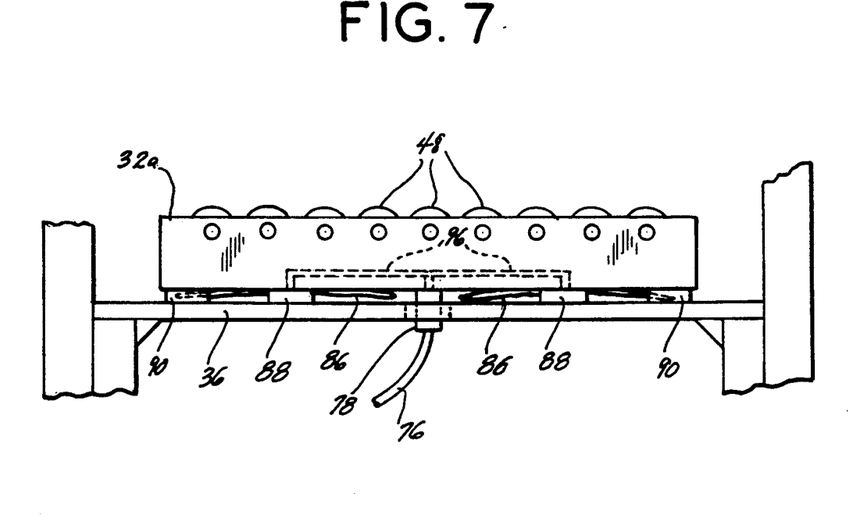
FIGS. 7–9 are sectional views showing the operation of airbags to support the air pallet of FIG. 4 on an air table.

Referring to FIG. 7, there is shown air bags, or annular diaphragms 86, in a deflated condition, air line 76 being closed. As in FIG. 6, air pallet 32a is shown supported on air table 36 by means of center landing pads 88 and corner landing pads 90.

Figure 8:
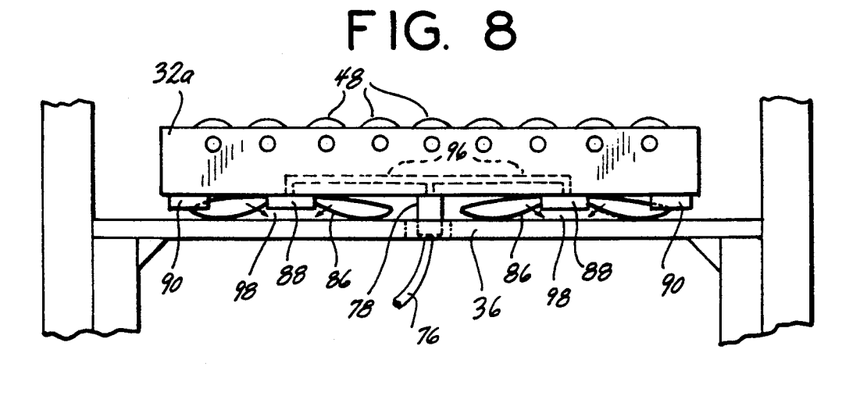

Referring to FIG. 8, there is shown diaphragm 86 being inflated by air received through air line 76, the diaphragms being coupled to air line 76 through conduits 96. As the diaphragms are inflated, the outer portions thereof initially remain in contact with air table 36, forming closed plenum chambers 98. Small openings are provided around the inner edges of the annular diaphragms, enabling air under pressure to flow into the plenum chambers 98 from the air bags or diaphragms 86.

Figure 9:
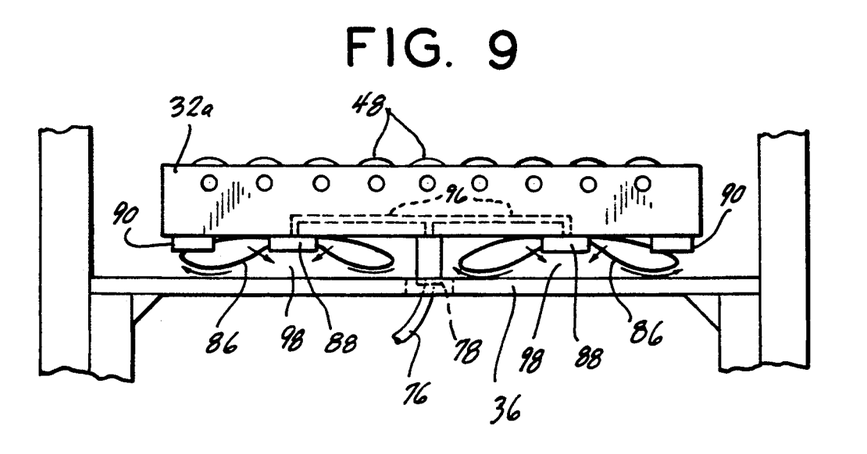

When the air pressure in the plenum chambers 98 becomes sufficiently great, air is forced out of the chambers, beneath the air bags 86, and pallet 32a is raised upwardly from air table 36, to a height which is on the order of several thousandths of an inch. Referring to FIG. 9, there is shown air pallet 32a in such raised condition, such condition being maintained as long as air line 76 remains open.

Figure 10:
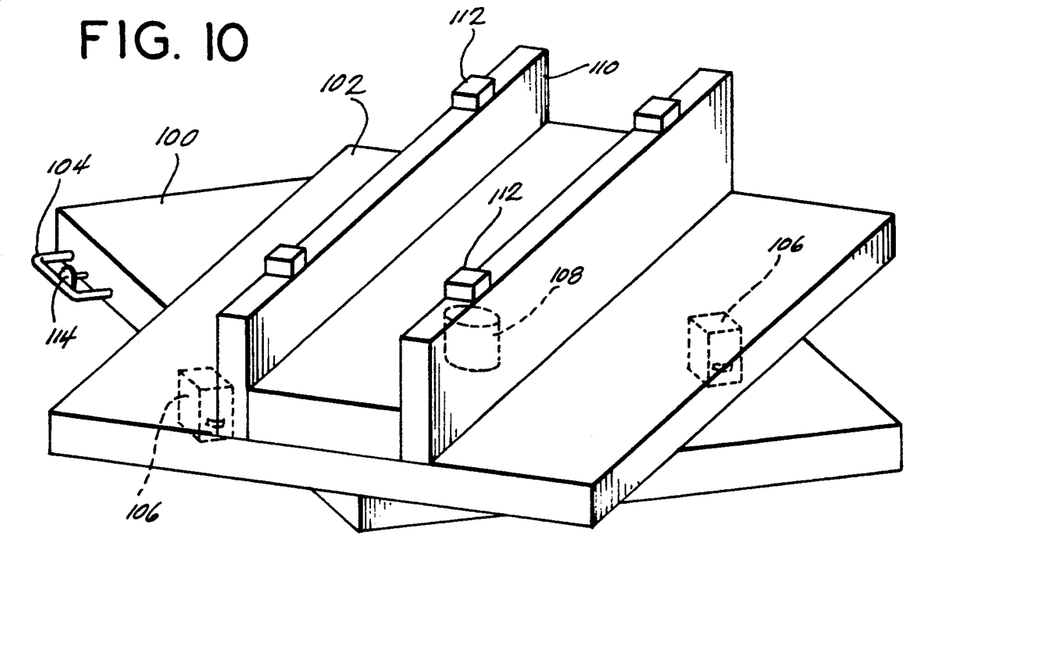
FIG. 10 is a perspective view showing the principal components of a machine air pallet for the embodiment of FIG. 1.

Referring to FIG. 10, there is shown an air pallet 30 comprising a lower platform 100 and an upper platform 102, both platforms 100 and 102 having arrays of air bags 86 on their respective undersides which are similar or identical to the aforedescribed airbag array on the underside of air pallet 32a. When the airbags on the underside of lower platform 100 are inflated, a cushion of air is generated which raises air pallet 30 upwardly from its air table 52, enabling a human operator to easily translate air pallet 30 over its air table. A hand grip 104 is joined to lower platform 100 for the use of the operator in performing such translations. To prevent lateral motion of air pallet 30 as it is being translated, guide blocks 106 are placed upon the underside of platform 100. Guide blocks 106, which are similar or identical to guide blocks 78, are sized to fit into a slot which runs along the length of air table 52.

Referring further to FIG. 0, there is shown a pin 108 which joins upper platform 100 and lower platform 102 together, in pivotable relationship. Consequently, when the airbags on the underside of platform 102 are inflated raising platform 102 upwardly from platform 100, platform 102 may be easily indexed or rotated by a human operator, relative to platform 100. It has been found that by providing air pallet 30 with such indexing or rotating capability, the efficiency with which an operator can load a machine pallet 26, positioned upon air pallet 30, may be significantly enhanced.

Referring again to FIG. 10, there is shown a machine pallet support structure 110 rigidly mounted upon the upper surface of platform 102. Structure 110 is provided to receive a machine pallet 26 from stacker crane 20, and to rigidly support the machine pallet when the air pallet 30 is translated over an air table 52 and when the machine pallet is being loaded with a part and a fixture. Machine pallet retention pads 112 are placed upon structure 110, and are selectively spaced apart so that a machine pallet 26 placed upon structure 110 will fit therebetween. At the same time, the machine pallet will be prevented by retention pads 112 from moving forwardly or backwardly along structure 110.

Referring to FIGS. 10 and 11 together, there is shown a switch 114, enclosed within hand grip 104, which may be moved outwardly from and inwardly toward pallet 30 by an operator, and which may be retained in one of three positions by notches 114a–c. When the switch is retained in a position by notch 114a, the airbags 86 on the undersides of both platforms 100 and 102 are deflated. When the switch is retained in a position by notch 114b, the airbags 86 on the underside of platform 100 are inflated, to enable translation of air pallet 30 over an air table 52. At the same time, the airbags of platform 102 are in a deflated condition, to prevent indexing thereof relative to platform 100. When the switch is retained in a position by notch 114c, the air bags of platform 102 are inflated, allowing indexing thereof, and the airbags of platform 100 are deflated, preventing translation. It will be seen that by providing switch 114, a machine pallet 26 on air pallet 30 cannot be both translated and rotated at the same time. An operator in a preparation station 28 is thereby provided with a heightened degree of control over movement of a machine pallet upon an air pallet 30.

Figure 12:
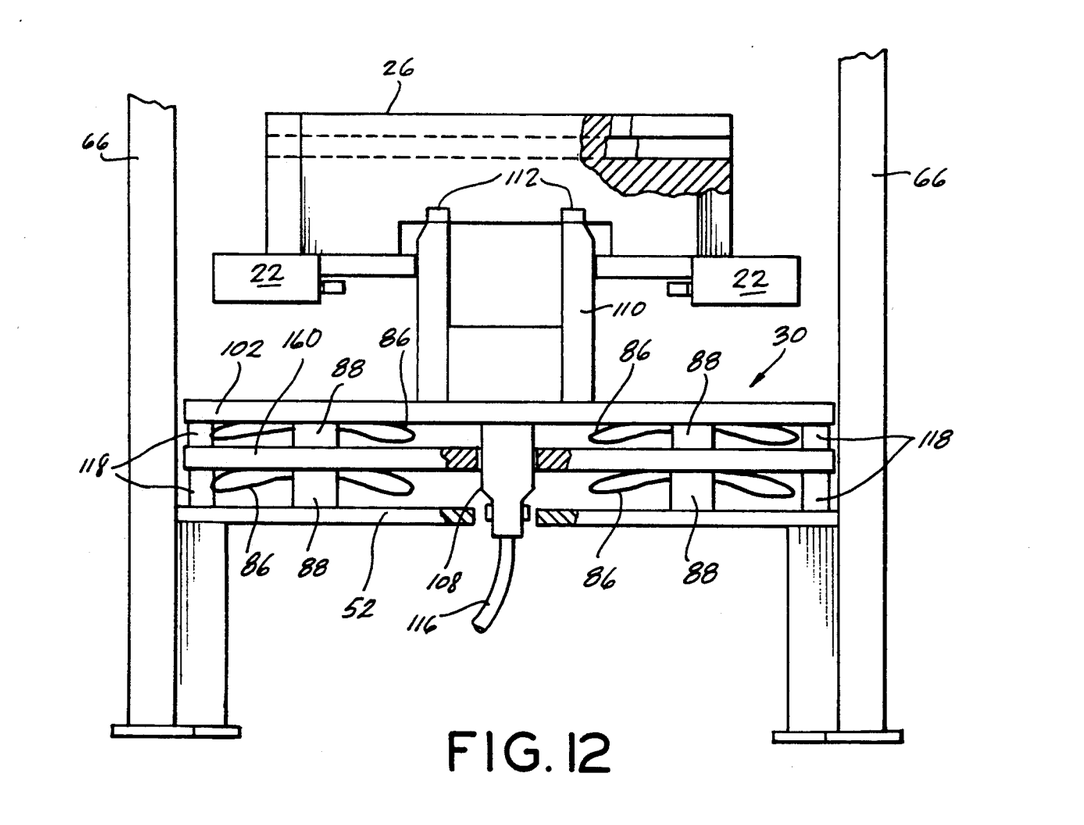
FIG. 12 is a sectional view showing the operational relationship between the stacker crane and a machine pallet air station employing the machine air pallet of FIG. 10.

Referring to FIG. 12, there is shown an air pallet 30 located at the extreme end of an air table 52, beneath a column 16, to receive a machine pallet 26 from lifting forks 22 of stacker crane 20. There is further shown an air line 116 passing upwardly into pin 108 to provide air for inflating airbags 86 of platforms 100 and 102. Air pallet 30 is shown in FIG. 12 supported upon center landing pads 88 and corner landing pads 118.

In a modification of the above embodiment, a number of machine pallets could be loaded with parts and fixtures, and then be stored in rack structures 14a and 14b. Stacker crane 20 and machining centers 12 could then be operated automatically, under the control of system computer 34, to move and machine the parts without any involvement of a human operator.

Obviously, many other modifications and variations of the present invention are possible in light of the above teachings, and it is therefore understood that within the scope of the disclosed inventive concept, the invention may be practiced otherwise than as specifically described.

What is claimed is:

1. A machine system comprising:

a vertically oriented rack structure having a first side and a second side and provided with number of discrete addressable bins, each of said bins forming a part storage location;

a number of machining centers proximate to said rack structure for selectively machining parts received from said bins;

a part preparation station located on the first side of said rack structure to facilitate preparation of a part received from one of said part storage locations for processing by one of said machining centers;

a stacker crane provided with forks for selectively engaging a storage pallet and a machine pallet and for controllably withdrawing a pallet from a selected bin and for sequentially moving such pallet from said selected bin to said part preparation station, from said part preparation station to ne of said work units, from one of said work units to said part preparation station and from said part preparation station to a final destination; said stacker crane being constrained to move along the second side of said rack structure;

an air table having a flat surface in said part preparation station that has a first end at an operator position and a second end that is accessible to said stacker crane;

a first pallet support platform on said air table for moving a pallet along said air table between said stacker crane and the operator position in said part preparation station;

a first array of air bags on the underside of said first pallet support platform for maintaining a cushion of air to prevent contact between said first pallet support platform and said air table;

a second pallet support platform mounted n a pallet support platform for receiving a pallet with a workpiece mounted thereon;

pivot for mounting said second pallet support platform upon said first pallet platform so that said second pallet support platform is rotatable relative to said first pallet support platform;

a second array of air bags positioned on the underside of said second pallet support platform for maintaining a cushion of air to prevent contact between said first and second pallet support platforms when said second pallet support platform is rotated relative to said first pallet support platform;

guide means for guiding said stacker crane for movement along a rectilinear path from said machining centers and along said rack structure and part preparation station to the final destination and return; and control means connected to regulate the operation of said stacker crane to withdraw a pallet from a selected bin, to deposit said withdrawn pallet on said second pallet support platform, to move a pallet from said second pallet support platform to one of said machining centers, and to move a pallet to the final destination after the part thereon has been machined.

2. A machining system comprising: a plurality of work stations for performing work operations on workpieces; a workpiece storage for the storage of workpieces; a transporter adapted to transport workpieces between said workpiece storage and said work stations; means on said transporter for loading and unloading workpieces to and from said workpiece storage and said work stations; a control for regulating the operation of said transporter; data means for supplying data to said control designating the workpiece to be transferred from said workpiece storage and the work station to which such workpiece is to be transferred; power means responsive to said control for actuating said transporter to remove the workpiece designated by said data from said workpiece storage and transfer it to the work station designated by said data; the workpieces being mounted on storage pallets as well as on machine pallets for securement in a work station while a work operation is being performed on the workpiece carried by the machine pallet; a part preparation station at which a workpiece is removed from a storage pallet and is set up on a machine pallet for the performance of a work operation and removed therefrom after the work operation is completed; and shuttle means movable about said part preparation station for moving either a storage pallet with the part thereon or a machine pallet with a part thereon to place the pallet in a convenient position for the operator.

3. A machining system according to claim 2 wherein said shuttle means comprises; an air pallet adapted to receive either a machine pallet or a storage pallet with parts thereon and an air table for receiving said air pallet and including means for establishing a cushion of air between said air pallet and said air table to facilitate movement of said air pallet along said air table.

4. A machining system according to claim 2 wherein said shuttle means is positionable to render it accessible to said transporter for receiving a pallet from said transporter or to enable said transporter to remove a pallet from said shuttle means.

5. A machining system according to claim 2 wherein said part preparation station includes a conveyor having communication with said air table for receiving a pallet from said air pallet on said air table; and power means connected to actuate said conveyor to facilitate movement of pallets about the part preparation station.

6. A machining system according to claim 3 wherein said part preparation system includes a plurality of air tables and a portion of said air tables are provided with air pallets especially adapted to carry storage pallets while the other air tables are provided with air pallets especially adapted to carry machine pallets.

7. A machining system comprising: a storage structure for providing a number of discrete part storage locations; a number of work units proximate to said storage structure for selectively machining workpieces received from said part storage locations; a part preparation station proximate to said storage structure for enabling a system operator to prepare a workpiece received from one of said part storage locations for processing by one of said work units; and a transport device adapted to receive a selected workpiece from one of said storage locations and transport it to said part preparation station, and then move said workpiece from said part preparation station to one of said work units, and then remove said workpiece from the work unit and transport it to a selected final destination.

8. A machining system according to claim 7 characterized by a computer connected to regulate the operation of said transport device for locating and transferring parts.

9. A machining system according to claim 8, characterized by means connecting said computer to said work units and including a memory for storing work programs that are transmitted selectively for regulating the operation of said work units to perform the required work operation for the selected workpiece.

10. A machining system according to claim 7 including a control for regulating the operation of said transporter, data means for supplying data to said control designating the workpiece to be transferred from said workpiece storage or said part preparation station and designating the work station to which such workpiece is to be transferred, and power means responsive to said control for actuating said transporter to remove the workpiece designated by said data from said workpiece storage and transfer it to said part preparation station and to remove the designated workpiece from said part preparation station and transfer it to the designated work station.

11. A machining system according to claim 10 wherein said data means also supplies data to said control for regulating the work station for performing the designated work operation on the workpiece and means connected for controlling the operations of the selected work station in accordance with said data to perform the required work operation.

12. A machining system according to claim 11 wherein said workpiece storage comprises, a plurality of discrete locations with each location adapted to store one pallet and the part carried by the pallet; and said data means supplies information designating the location that contains a pallet with the selected workpiece and said control regulates the operation of said transporter for removing the pallet contained at the designated location.

* * * * *